Oct. 25, 1960 M. KUBÍN 2,957,486
DEVICE FOR THE CHANGE OF THE CHARACTER OF INTERDEPENDENCE
BETWEEN THE INLET AND OUTLET MAGNITUDE
Filed April 8, 1957
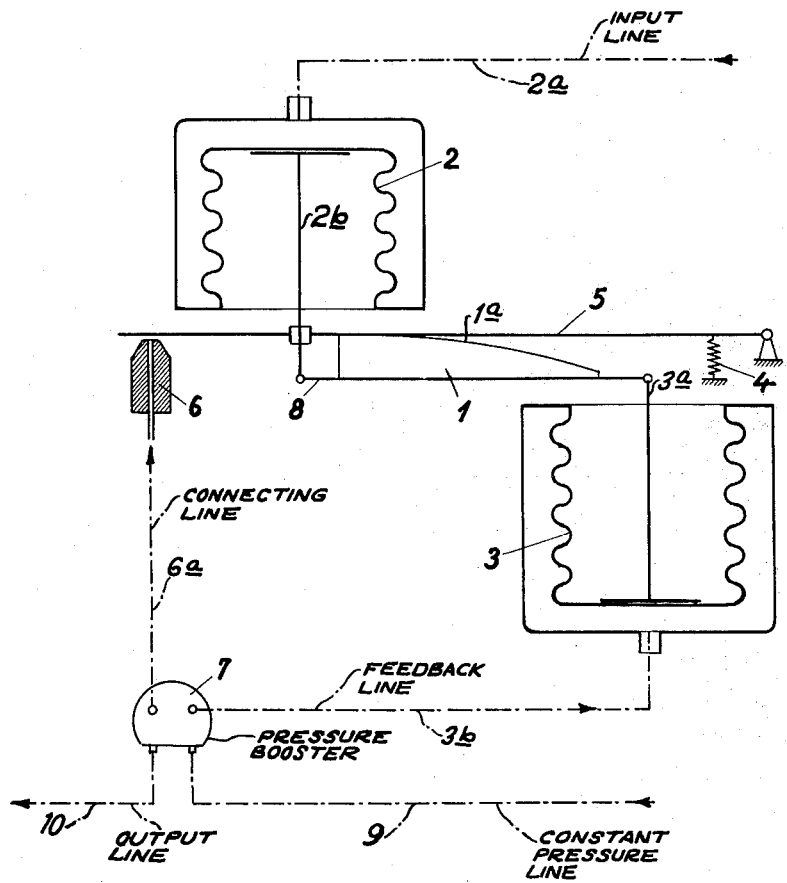
INVENTOR.
Miroslav Kubín
BY
Richard Ernst
Agt

United States Patent Office 2,957,486
Patented Oct. 25, 1960

2,957,486

DEVICE FOR THE CHANGE OF THE CHARACTER OF INTERDEPENDENCE BETWEEN THE INLET AND OUTLET MAGNITUDE

Miroslav Kubín, Prague, Czechoslovakia, assignor to Regula-Vyvoj, narodni podnik, Prague, Czechoslovakia Filed Apr. 8, 1957, Ser. No. 651,504

2 Claims. (Cl. 137—85)

The present invention relates to a device for changing the mathematical character of the interdependence between two physical magnitudes. Thus, for example, in flow meters, the pressure difference between the upstream and downstream sides of an orifice is determined as a measure of the rate of flow, but, the rate of flow only varies in proportion to the square root of this pressure difference, rather than linearly, and the present invention has for its object to provide a pneumatic evolution device for flow meters or for other purposes, whereby the relationship between the rate of flow and the measured pressure difference, or between other variables, can be conveniently altered.

In measuring various technical magnitudes, such as, for example, in measuring the flow through an orifice, the resulting value is given, as a rule, as a nonlinear function of a determined variable. For numerous purposes, such as, for example, when operating a counter for metering the flow, or a registering or recording apparatus on the basis of the measured pressure drop across a metering orifice and the rate of flow is a function of the square root of the pressure difference, a uniform or linear scale is required, that is, the relationship between the value to be determined and the control impulse needs to be altered so that the control impulse is a linear function of the rate of flow. In the devices known hitherto, the required alteration of the relation between the value to be determined and the control impulse is effected in various ways, such as, for example by means of an evolution cam in the case of quantity measuring.

All devices hitherto known for changing the existing interdependence between two physical values or magnitudes have the disadvantages of making available only a small adjustment force, excessive friction and backlash.

The present invention aims at eliminating the above disadvantages of the existing devices of this type.

The above, and other objects, features and advantages of the invention will be apparent in the following detailed description of an illustrative embodiment which is to be read in connection with the accompanying drawing containing a single diagrammatic view of a device for use with a flowmeter.

Referring to the drawing in detail, it will be seen that the device for varying the interdependence or relationship between two magnitudes in accordance with the invention includes a member 2 which is responsive to an input magnitude and which, in the illustrated embodiment, is in the form of a bellows expanding and contracting within a housing in response to variations in the value of the pressure of fluid fed to that housing through a line or conduit 2a. Thus, where the illustrated device embodying the invention is used in connection with a flowmeter which measures the rate of flow of a fluid through a metering orifice, the pressure fed to the housing of bellows 2 through the line 2a is proportional to the difference between the pressures at the upstream and downstream sides, respectively, of the metering orifice or throttling restriction. Since the rate of flow of the fluid does not vary linearly with variations in the difference between the pressures at the opposite sides of the metering orifice, but rather is proportional to the square root of the pressure difference, it is the purpose of the illustrated device embodying the invention to provide an output magnitude, specifically, a fluid pressure, which is linearly proportional to the difference in pressures at the opposite sides of the metering orifice so that such output magnitude or pressure can be conveniently employed for operating a flow indicator or recorder or a suitable control.

It is apparent that the desired output magnitude or pressure which is linearly proportional to the difference between the pressures at the opposite sides of a metering orifice will have a nonlinear relationship or interdependence with the operating or input pressure acting on the bellows 2 and which, in fact, has a nonlinear relationship to the difference between the pressures at the opposite sides of the metering orifice. In order to obtain the necessary non-linear relationship between the input pressure acting on the bellows 2 and the output magnitude or pressure, the device embodying the invention further includes a lever 8 which, at one end, is pivotally connected to an actuating stem 2b connected to the bellows 2, while the opposite end of the lever 8 is pivotally connected to a stem 3a which is connected to a device 3 responding to the output magnitude. Since the illustrated embodiment of the invention employs compressed air for its operation, the device 3 is conveniently in the form of a bellows which expands and contracts within a housing to which the output magnitude, in the form of the pressure of compressed air, is fed by way of a line 3b. It is apparent that the position of the lever 8 will, at all times, depend upon the pressures acting upon the bellows 2 and 3, respectively.

The control of the pressure acting through line 3b upon the bellows 3 is effected by way of a valve in the form of a discharge nozzle 6 and a flap constituted by the free end of a pivoted lever 5 and which is movable toward and away from the opening of the nozzle 6 in order to regulate the rate of discharge of compressed air from the latter. The compressed air is fed to the nozzle 6 by way of a line 6a extending from a pressure booster 7 which is a conventional device, while the line 3b and an output line 10 also extend from the pressure booster 7 to which a supply of compressed air is fed by way of a line 9 extending from a source of constant pressure.

The lever 5 is yieldably urged in the direction moving its flap-like end toward the nozzle 6 by a tension spring 4, thereby tending to close the nozzle 6 and to correspondingly increase the pressure within the line 6a. The conventional pressure booster 7 is designed to increase the pressure existing within the line 6a and to feed such increased pressure through the line 3b to act upon the bellows 3 and through the line 10 to act upon the indicator, recorder or control device to which the line 10 is connected.

In accordance with the present invention, the illustrated device further includes a member 1 mounted on the lever 8 and having a profiled or contoured surface 1a engaged by the lever 5 so that the angular position of the latter, and hence, its spatial relationship to the nozzle 6, will depend upon the position of the lever 8, as established by the pressures acting upon the bellows 2 and 3, and also upon the contour given to the surface 1a of the member 1.

The above described device operates as follows:

In the event of an increase in the pressure exerted upon the bellows 2 by way of the line 2a, which increase in pressure signifies an increase in the pressure difference between the opposite sides of a metering orifice and a corresponding, nonlinearly proportional increase in the rate of flow through that orifice, the end of the lever 8 connected to the stem 2b of bellows 2 is moved downwardly, thereby to permit the spring 4 to draw the lever 5 downwardly so that the flap-like end of lever 5 tends to close the opening of the orifice 6. Such closing of the orifice 6 causes an increase in the pressure within line 6a, and the pressure booster 7 produces a proportionately greater increase in the pressure existing in the lines 3b and 10. The increased pressure in the line 3b acts upon the bellows 3 which, in turn, moves the end of the lever 8 connected to the stem 3a in the upward direction, and the profiled surface 1a of member 1 acts upwardly against the lever 5 to move the latter upwardly and thereby increase the opening of the nozzle 6 for reducing the pressures in the line 6a and in the lines 3b and 10. It will be apparent that the upward movement of the flap-like end of lever 5 resulting from the action of the pressure in line 3b on bellows 3 is smaller than the previous downward movement of the flap-like end of lever 5 resulting from the pressure acting on bellows 2 by way of the line 2a. Thus, the upward and downward movements of the flap-like end of lever 5 are repeated, but with progressively decreasing amplitudes until the lever 5 finally attains a stable position in which the inlet pressure acting in line 2a and the outlet pressure in line 10 have a predetermined relationship or interdependence as established by the contour of the surface 1a of member 1.

When the described device is used in connection with a flowmeter so that, as previously described, the rate of flow to be measured is proportional to the square root of the difference between the pressures at the opposite sides of the metering orifice, while the pressure acting in line 2a is directly proportional to such pressure difference, then the surface 1a of member 1 has a contour, which may be established by graphic means, and which is effective to obtain a linear interdependence between the output pressure 10 and the rate of flow through the metering orifice.

By a suitable choice of the shape of the profiled lever 1 it is also possible to bring about an interdependence or functional relationship between the inlet pressure operating the bellows 2 and the outlet pressure that differs from that above described.

In those cases where it is required for technical reasons, the pressure responsive device 3 functioning as a feedback, can be adapted to function at the same time as a source of the resultant motion, for example, as the motor means for an indicating gauge, so that the device 3 may replace fully the receiver of the altered pressure. However, it is to be understood that the present invention is in no way limited to pressure gauge systems. Instead of the corrugated pressure responsibe bellows 2 and 3 it is possible to provide, for example, induction coils and instead of the tuning system formed by the flap-nozzle 5, 6 use may be made of a slide valve or a nozzle with a needle valve. The pneumatic evolution device described above is particularly suitable for carrying out a linearisation of the square relation between the pressure difference measured at opposite sides of a metering orifice and the rate of flow through such orifice, where a scale with uniform divisions is required. The device according to the present invention is not sensitive to load and has an adequate shifting output force.

I claim:

1. Apparatus for establishing a predetermined relationship between input and output physical quantities, comprising lever means, first means linearly responsive to the input physical quantity for exerting a force on one end of said lever means, second means linearly responsive to the output physical quantity for exerting a force on the other end of said lever means, means supplying a constant physical quantity, means including valve means connected to said supplying means for converting said constant physical quantity to the output physical quantity, movable regulator means for controlling the condition of said valve means and thereby the value of the output physical quantity, and camlike protrusion means having a structural configuration corresponding to said predetermined relationship mounted on said lever means and engaging said regulator means for controlling the position of said regulator means.

2. Apparatus for establishing a predetermined relationship between input and output pressures, comprising a lever, a first bellows linearly responsive to the input pressure for exerting a force on one end of said lever, a second bellows linearly responsive to the output pressure for exerting a force on the other end of said lever, a source of constant pressure, a pressure converter including a valve connected to said source for converting said constant pressure to the output pressure, a flap regulator for controlling the condition of said valve and thereby the value of the output pressure, and a contoured member having a structural configuration corresponding to the predetermined relationship mounted on said lever and engaging said flap regulator for controlling the position of said flap regulator with respect to said valve.

References Cited in the file of this patent

UNITED STATES PATENTS

| | | |
|---|---|---|
| 1,588,178 | Fales | June 8, 1926 |
| 2,311,853 | Moore | Feb. 23, 1943 |
| 2,354,423 | Rosenberger | July 25, 1944 |
| 2,408,685 | Rosenberger | Nov. 1, 1946 |
| 2,521,477 | Pellettere | Sept. 5, 1950 |
| 2,563,374 | Rosenberger | Aug. 7, 1951 |
| 2,672,151 | Newbold | Mar. 16, 1954 |
| 2,675,818 | Gallo | Apr. 20, 1954 |
| 2,736,199 | Ibbott | Feb. 28, 1956 |
| 2,771,897 | Bailey | Nov. 27, 1956 |
| 2,800,136 | Bowditch | July 23, 1957 |
| 2,816,562 | Dyson | Dec. 17, 1957 |
| 2,841,162 | Stough | July 1, 1958 |